(12) United States Patent
Richard

(10) Patent No.: US 6,686,935 B1
(45) Date of Patent: Feb. 3, 2004

(54) METHOD AND APPARATUS FOR OBJECT KERNING

(75) Inventor: Christian James Richard, Morrisville, NC (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/578,191

(22) Filed: May 24, 2000

(51) Int. Cl.$^7$ ................................................ G09G 5/00
(52) U.S. Cl. ........................ 345/765; 345/775; 345/835
(58) Field of Search ................................ 345/619, 681, 345/765, 964, 677, 651, 662, 775, 835

(56) References Cited

U.S. PATENT DOCUMENTS

| | | | |
|---|---|---|---|
| 4,974,174 A | * 11/1990 | Kleinman | .................... 707/540 |
| 5,513,311 A | 4/1996 | McKiel | |
| 5,577,189 A | * 11/1996 | Gay et al. | .................... 345/800 |
| 5,627,954 A | 5/1997 | McFarland | |
| 5,796,401 A | * 8/1998 | Winer | ........................ 345/619 |
| 5,929,853 A | 7/1999 | Guha | |
| 6,003,048 A | 12/1999 | Fallside | ..................... 707/513 |
| 6,323,879 B1 | * 11/2001 | Sauerbrei | ..................... 345/672 |
| 6,333,749 B1 | * 12/2001 | Reinhardt et al. | .......... 345/629 |
| 6,364,485 B1 | * 4/2002 | Fateh | ........................ 351/203 |

FOREIGN PATENT DOCUMENTS

WO  9964968  12/1999  ........... G06F/17/50

* cited by examiner

*Primary Examiner*—John Cabeca
*Assistant Examiner*—Blaine Basom
(74) *Attorney, Agent, or Firm*—Duke W. Yee; A. Bruce Clay; Wayne P. Bailey

(57) ABSTRACT

METHOD AND APPARATUS FOR OBJECT KERNING A graphics software application provides the capability to select a plurality of graphical objects and automatically align them and adjust the spacing between them. The data processing system, under instruction of a program, responds to an instruction by the user to kern a plurality of selected graphical objects. The system aligns the objects and prompts the user to designate a distance adjustment. The system then automatically adjusts the distances between each pair of adjacent objects. Using the techniques of the present invention, a user may enter a large number of graphical objects and align them and precisely set their locations with respect to one another. Hence, a large number of graphical objects may be created and aligned quickly and efficiently without the need for numerous individual measurements.

10 Claims, 15 Drawing Sheets

METHOD AND APPARATUS FOR OBJECT KERNING

BACKGROUND OF THE INVENTION

1. Technical Field

The present invention relates to an improved data processing system and, in particular, to a method and apparatus for increasing and decreasing the spacing between two or more objects.

2. Description of Related Art

Graphical user interfaces, or "GUIs" as they are often designated, have become an increasingly common and popular feature of computers, especially personal computers (PCs). One of the many advantages of such GUIs is that they allow a user to create and edit documents and structures in a graphical manner by selecting and manipulating graphical display elements, such as icons, usually with a pointing device, such as a mouse. The Apple Macintosh user interface, Microsoft Windows operating environment, and UNIX X-Windows are common and very popular examples of GUIs, illustrating the fact that the advantages of GUIs over conventional text-based user interfaces are widely recognized.

Graphics software is one area, which benefits from GUIs. Graphics software applications, which allow users to create and edit drawings and illustrations, provide users with an environment in which the editable document resembles the form it will take on the printed page, world wide web (WWW) document, etc. This is referred to as "what you see is what you get" or "WYSIWYG." Commonly, a user may select to have a grid or ruler displayed to guide in the placement of graphical objects on the display screen. Frequently, the drawing or illustration dictates that objects be placed along a line on the display screen. For the purpose of uniformity, symmetry, or neatness of presentation, the positions of these objects in relation to one another may be important, particularly when an equal distance between objects is desired. Current graphics software applications do not allow the user to easily set the positions of a plurality of objects in relation to one another.

In word processing, "kerning" is the adjustment of text that involves slightly decreasing or increasing the amount of space between any two adjacent letters. Kerning is usually performed to improve the overall appearance of text. The amount of kerning depends on the font design and the specific pair of letters.

Currently, graphical software applications do not allow a user to easily adjust the amount of space between any two or more graphical objects, because the positions of the objects are independent. Furthermore, graphical objects do not always lie along a horizontal or vertical line. Therefore, it would be advantageous to have a technique for kerning graphical objects along a horizontal, vertical, or angled line.

SUMMARY OF THE INVENTION

The present invention solves the disadvantages of the prior art by allowing the user to select a plurality of graphical objects on a display screen and select or enter the distance between the objects. The distances are kerned or increased or decreased between the selected objects according to the input of the user.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
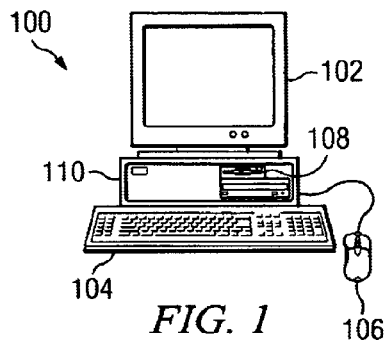
FIG. 1 is a pictorial representation of a data processing system in which the present invention may be implemented.

With reference now to the figures and in particular with reference to FIG. 1, a pictorial representation of a data processing system in which the present invention may be implemented is depicted in accordance with a preferred embodiment of the present invention. A computer 100 is depicted which includes a system unit 110, a video display terminal 102, a keyboard 104, storage devices 108, which may include floppy drives and other types of permanent and removable storage media, and mouse 106. Additional input devices may be included with personal computer 100, such as, for example, a joystick, touchpad, touch screen, trackball, microphone, and the like. Computer 100 can be implemented using any suitable computer, such as an IBM RS/6000 computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface that may be implemented by means of systems software residing in computer readable media in operation within computer 100.

Figure 2:
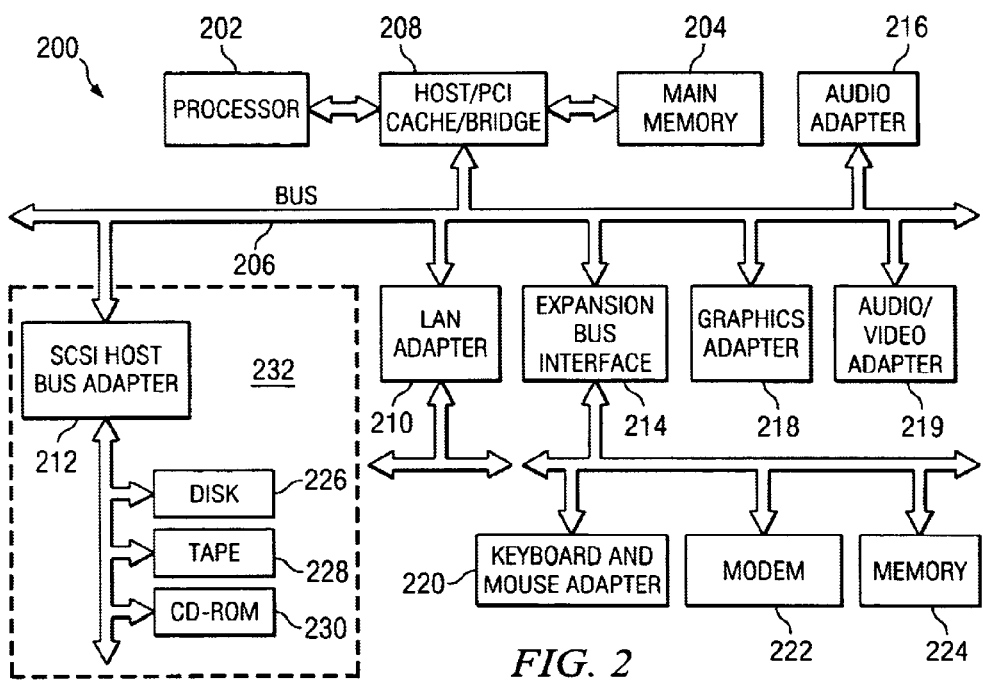
FIG. 2 is a block diagram of a data processing system in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows 2000, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented operating system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230, as noted by dotted line 232 in FIG. 2 denoting optional inclusion. In that case, the computer, to be properly called a client computer, must include some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a Personal Digital Assistant (PDA) device, which is configured with ROM and/or flash ROM in order to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226–230.

For purposes of illustration, the following examples and figures are shown to be implemented using Macromedia Freehand. Any trademarks and copyrighted information shown therein are believed to be owned by Macromedia, Inc., 600 Townsend St., San Francisco, Calif. 94103. The mechanism of the present invention may be implemented in a graphics program in which graphical objects are displayed. In this example, the present invention may be implemented by modifying the code of an existing graphics application or by means of a patch or macros, as known in the art.

Figure 3:
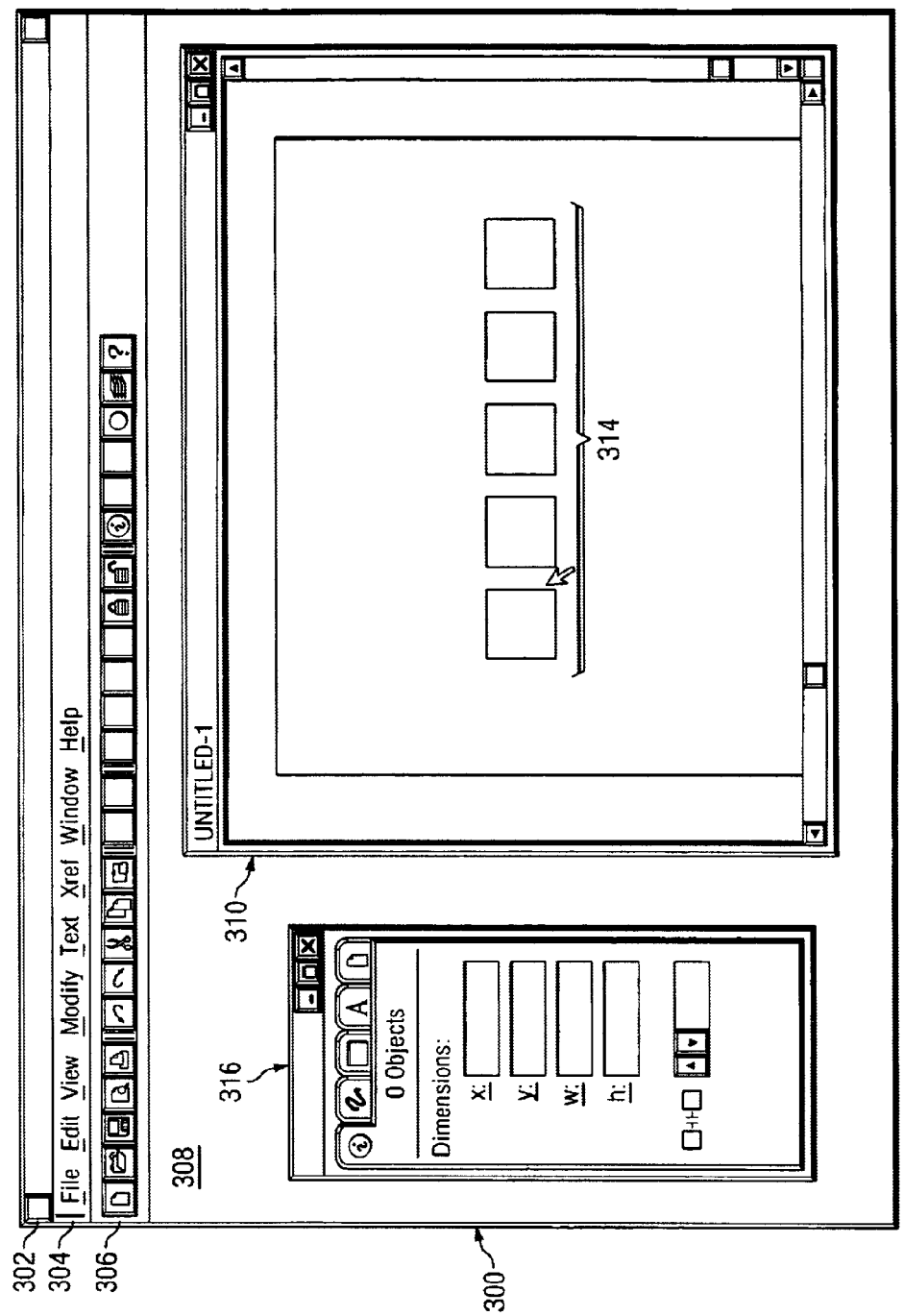
FIG. 3 is an example screen of display of a graphics program in which the present invention may be implemented.

An example of a screen of display of a graphics application is shown in FIG. 3. The screen comprises window 300, including a title bar 302. Graphics application program window 300 also includes a menu bar 304 and toolbar 306. Menus to be selected from menu bar 304 include "File", "Edit", "View", "Modify", "Text", "Xtras", "Window", and "Help". However, menu bar 304 may include fewer or more menus, as understood by a person of ordinary skill in the art. Toolbar 306 is a series of buttons, which produce commands when selected. Graphics program window 300 also includes a display area 308.

Also shown in FIG. 3 is a document window 310 and a floating toolbar or pallet 316. An example of a graphics document is shown in document window 310 including graphical objects [in box] 314. The operation of the present invention will with respect to the example document; however, it will be understood that the present invention may be implemented for use with any graphical drawing or illustration containing graphical objects.

Figure 4A:
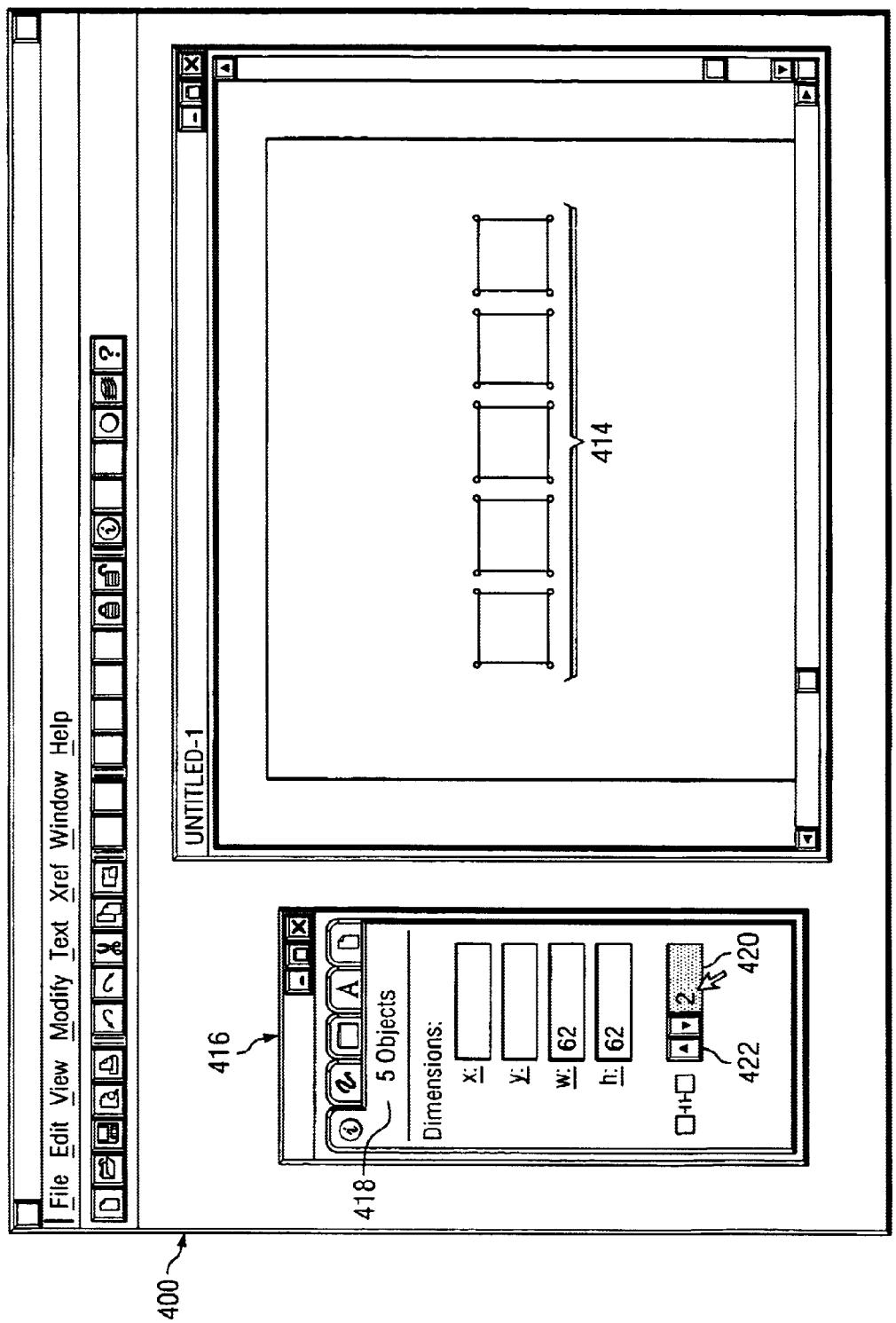
FIGS. 4A, 4B, 4C, and 4D are example screens of display showing the implementation of the object kerning technique of the present invention.

Turning now to FIG. 4A, a screen of display 400 is shown in which a plurality of graphical objects have been selected, as shown by highlighted portion 414. Pallet 416 displays the number of objects selected 418 and the distance between each pair of objects in the selection 420. In the example shown in FIG. 4A, the number of selected objects is "5" and the distance between the selected objects, also referred to as the inter-object distance, is "2". According to a preferred embodiment of the present invention, the distance between objects may be adjusted by entering a value directly into distance field 420. Alternatively, the distance value may be increased o decreased by selecting buttons 422. Other techniques for allowing the user to adjust the distance value will be readily apparent to a person of ordinary skill in the art.

Figure 4B:
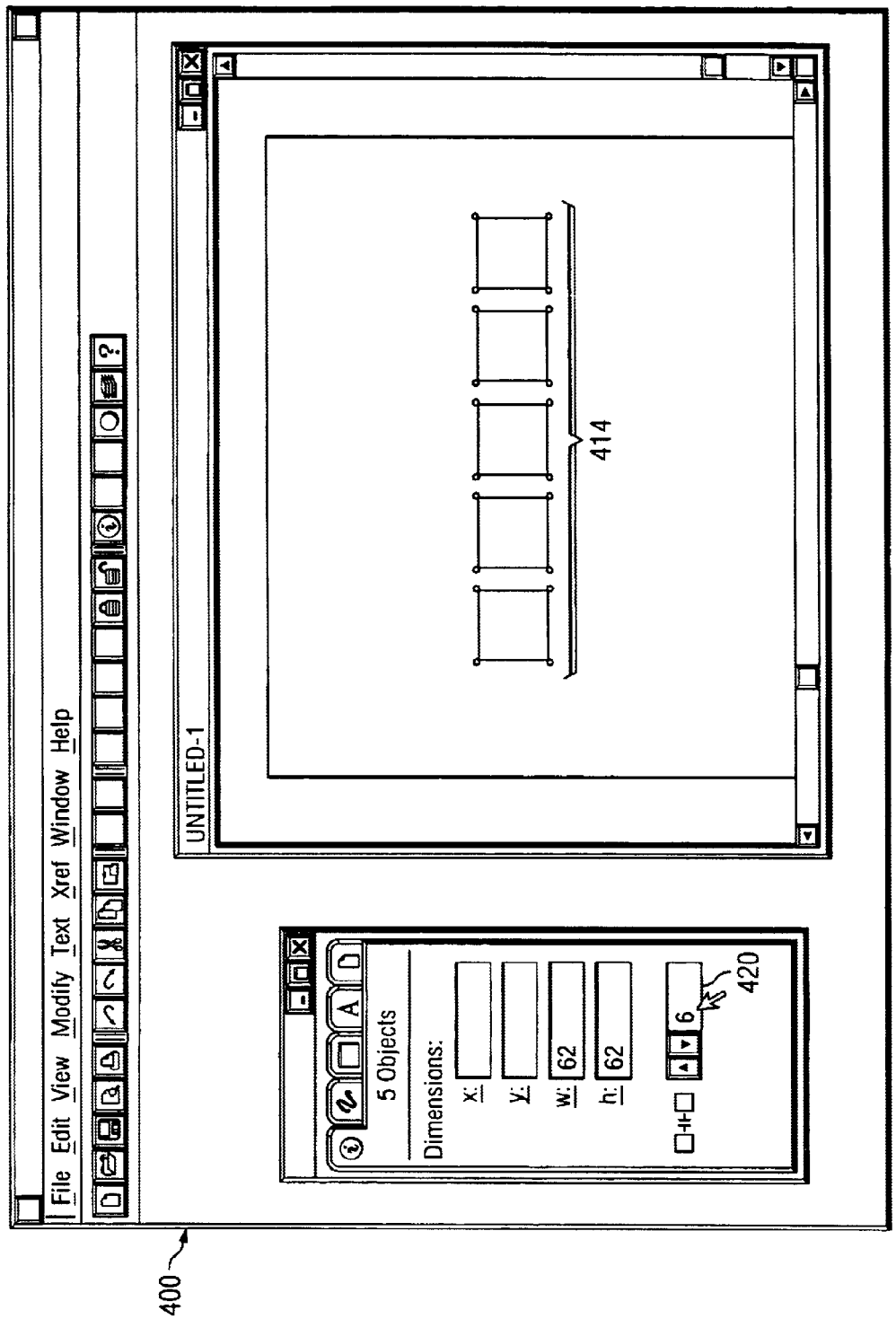

With reference to FIG. 4B, a screen of display 400 is shown in which the distance value in distance field 420 has been changed from "2" to "6". The changed distance is referred to as the adjusted distance. The positions of the selected objects 414 have been adjusted in response to the entered distance value, in accordance with a preferred embodiment of the present invention.

Figure 4C:
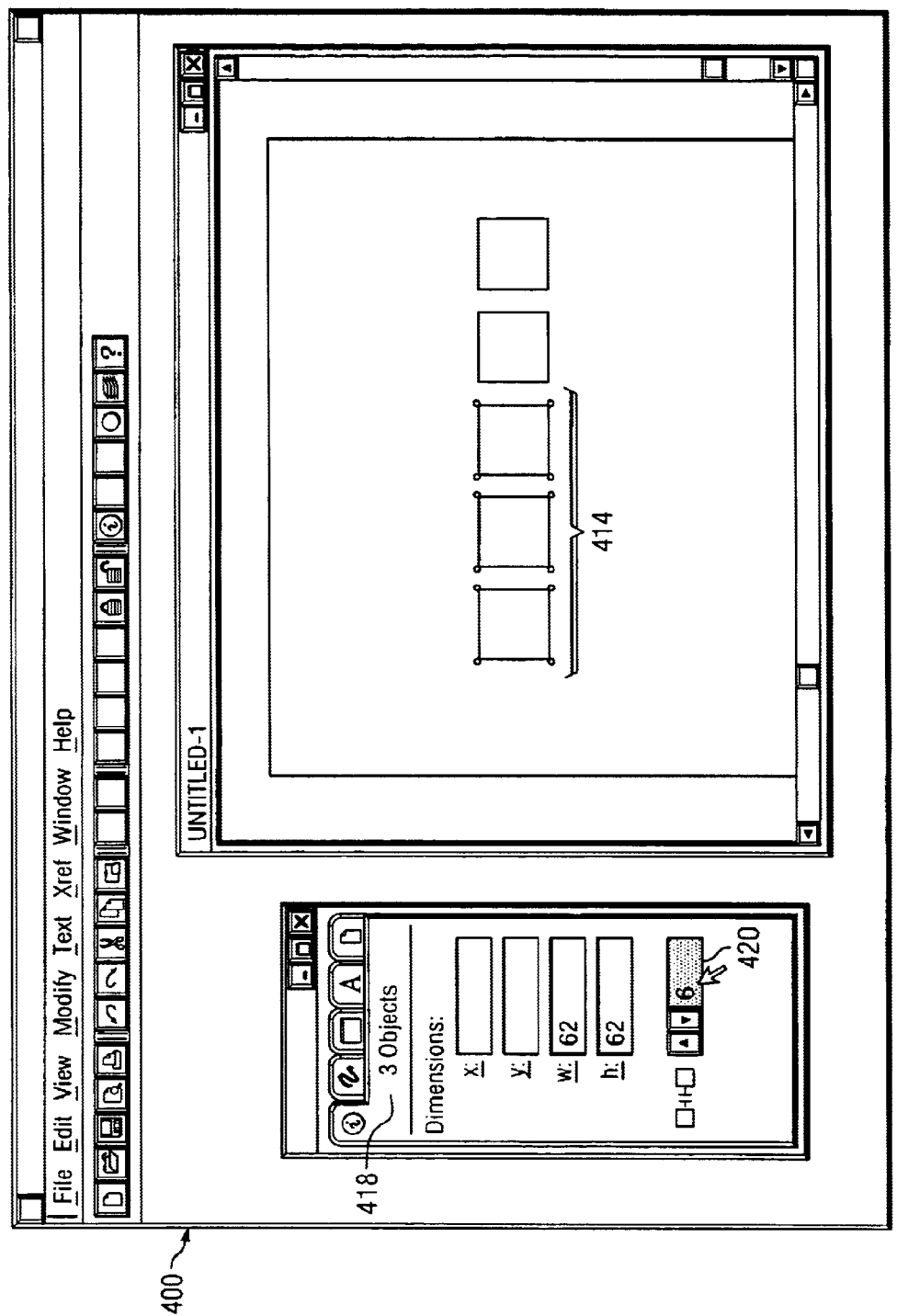
Figure 4D:
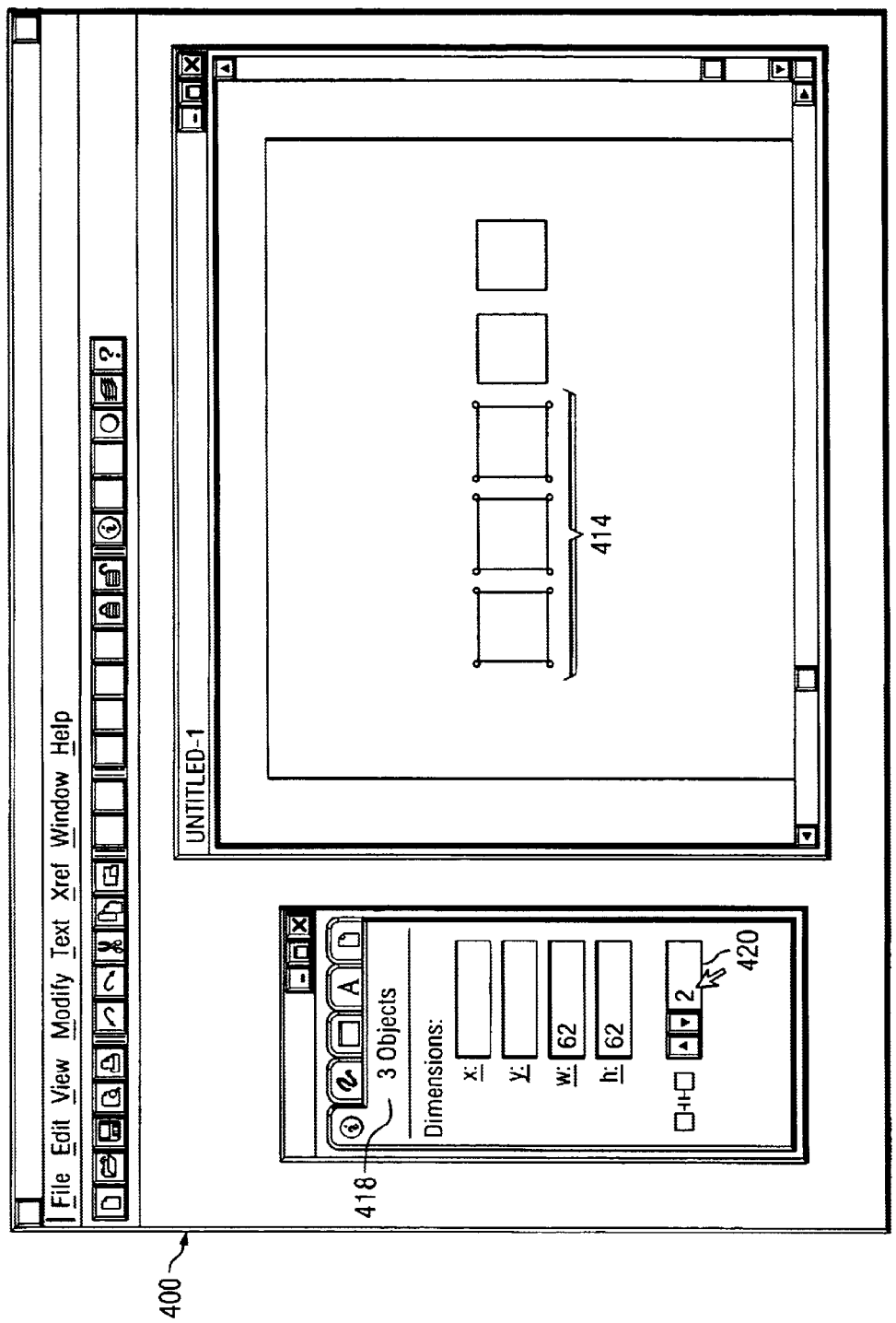

With reference to FIG. 4C, a screen of display 400 is shown in which a plurality of graphical objects have been selected, as shown by highlighted portion 414. In the example shown in FIG. 4C, the number of selected objects is "3" and the distance between selected objects is "6". With reference to FIG. 4D, a screen of display 400 is shown in which the distance value in the distance field 420 has been changed from "6" to "2". The positions of the selected objects 414 have been; adjusted in response to the entered distance value, in accordance with a preferred embodiment of the present invention.

Figure 5A:
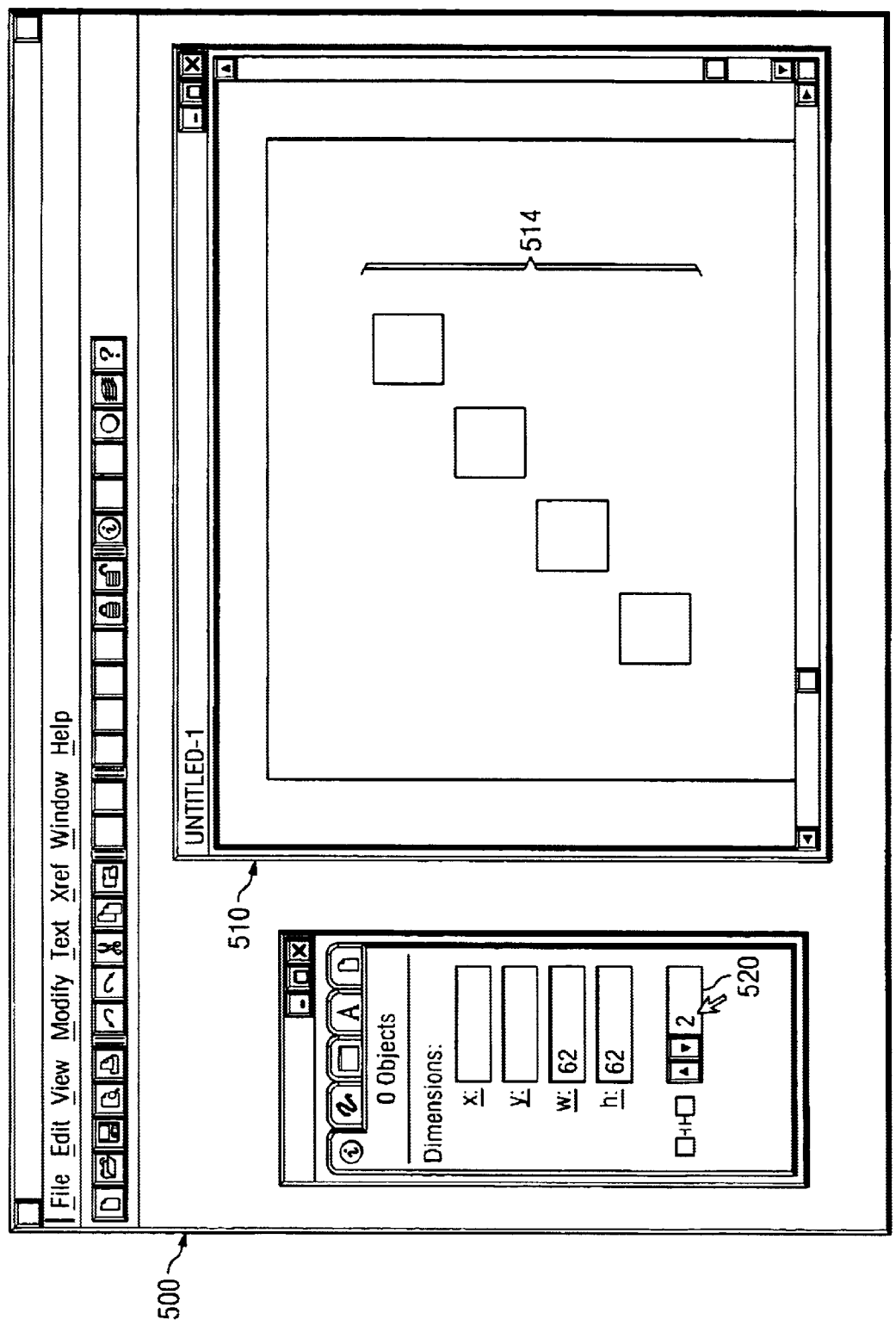
FIGS. 5A, 5B, and 5C are example screens of display showing the implementation of the object kerning technique of the present invention in which the graphical objects are aligned at an angle.

An example of a screen of display 500 of a graphics application is shown in FIG. 5A. An example of a graphics document is shown in document window 510 including graphical objects 514, which are aligned at an angle. The operation of the present invention with respect to objects aligned at an angle will now be described with respect to the example document.

Figure 5B:
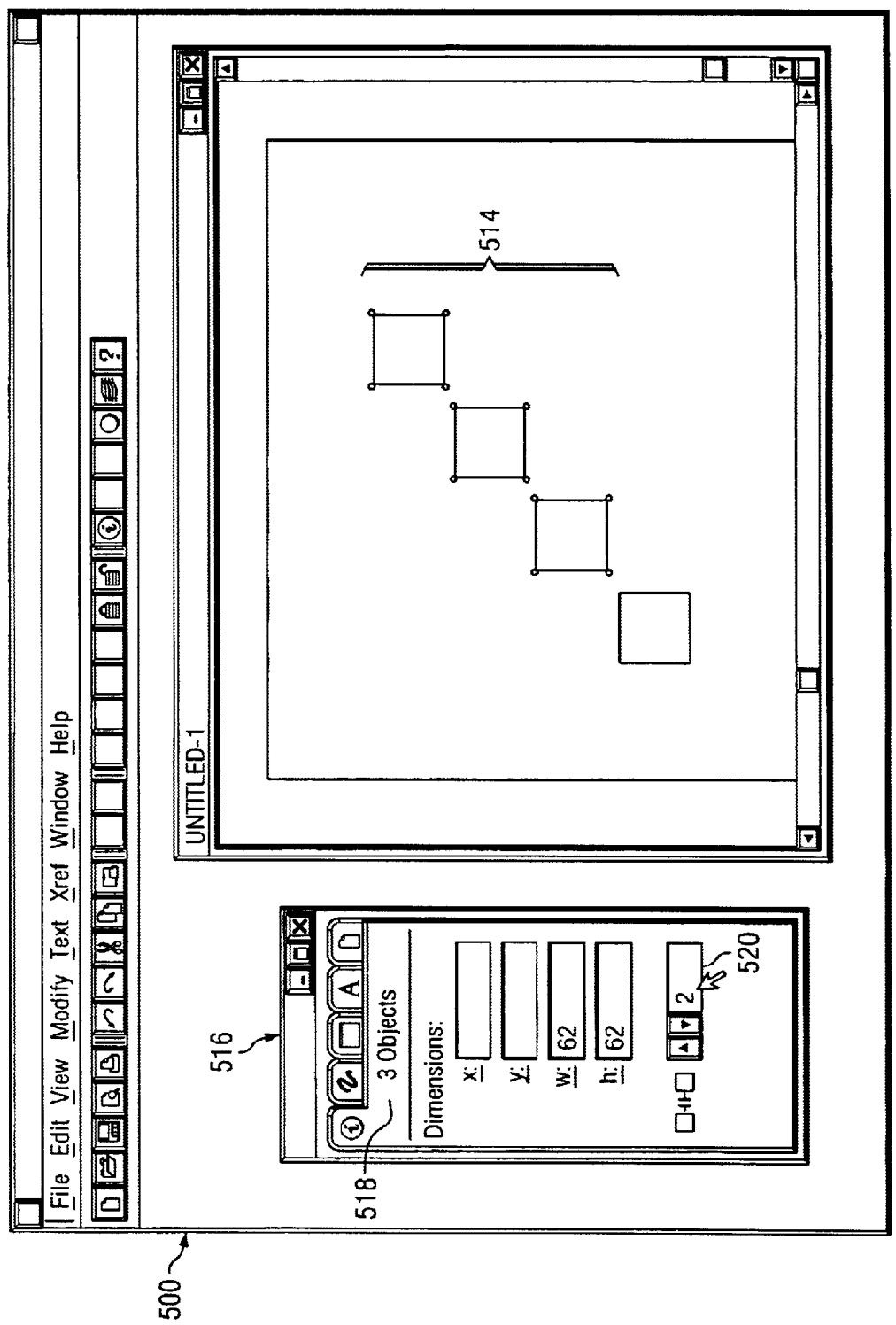

Turning now to FIG. 5B, a screen of display 500 is shown in which a plurality of graphical objects have been selected, as shown by highlighted portion 514. Pallet 516 displays the number of objects selected 518 and the distance between each pair of objects in the selection 520. In the example shown in FIG. 5B, the number of selected objects is "3" and the distance between the selected objects is "2".

Figure 5C:
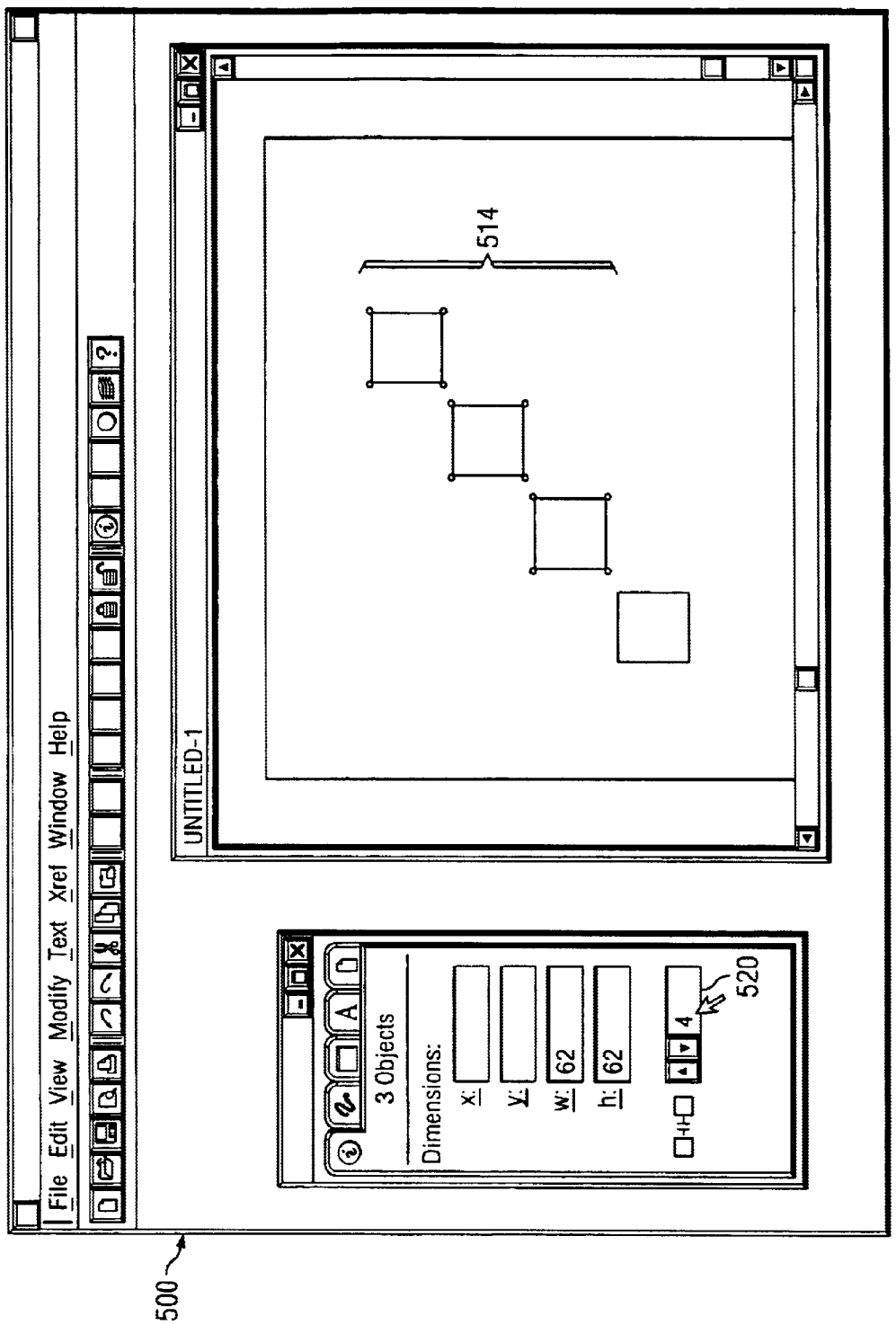

With reference to FIG. 5C, a screen of display 500 is shown in which the distance value is distance field 520 has been changed from "2" to "4". The positions of the selected objects 514 have been adjusted in response to the entered distance value, in accordance with the preferred embodiment of the present invention described above.

Figure 6:
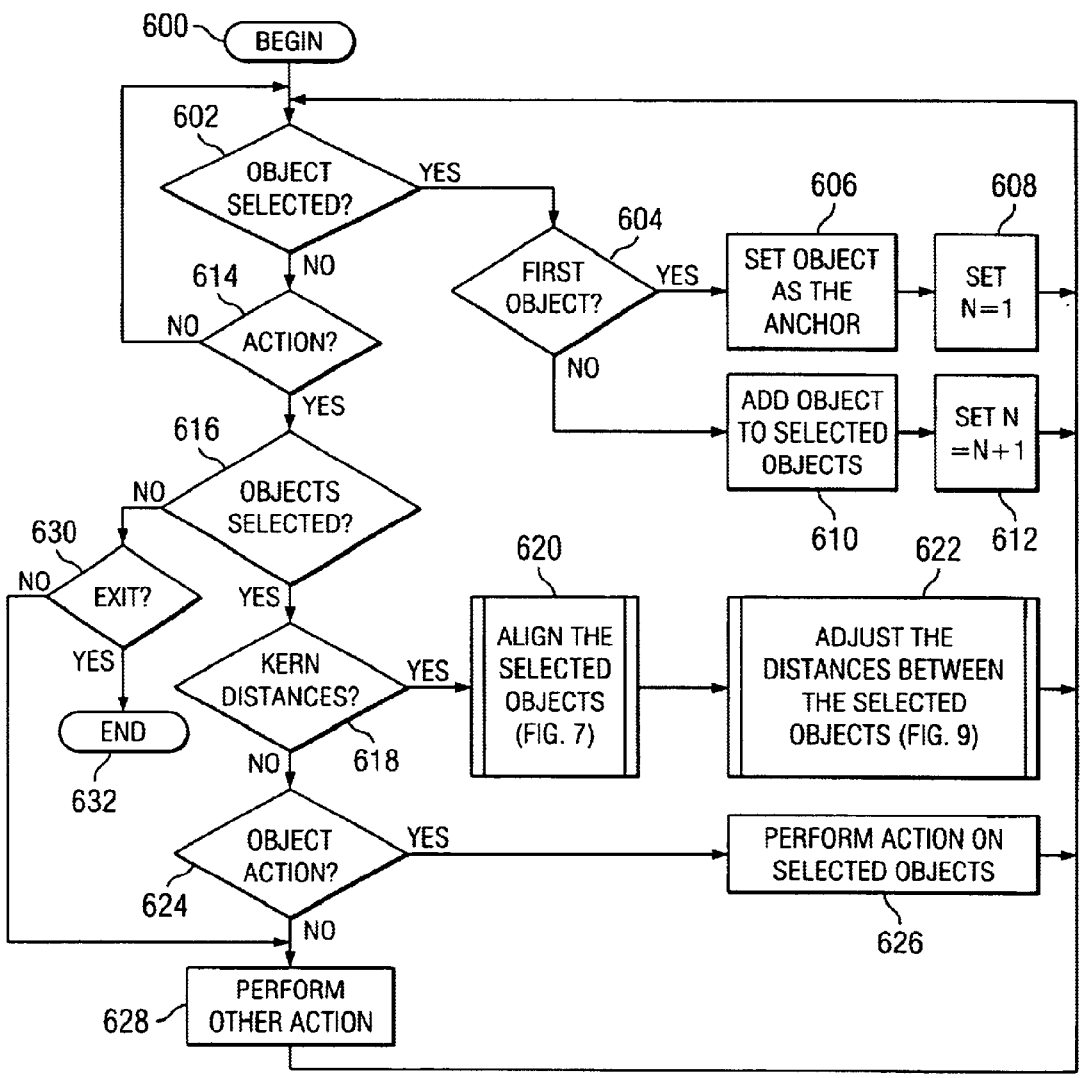
FIG. 6 is a flowchart of the general operation of the present invention.

With reference now to FIG. 6, a flowchart of the general operation of a graphics software application is depicted according to a preferred embodiment of the present invention. The present invention may be implemented in the graphics program shown in FIG. 3, wherein the graphics program provides the functionality of a conventional graphics program. However, the graphics program of the present invention allows the user to adjust the distances between graphical objects without the need to individually measure each distance and move each object.

The operation of the program begins (step 600) and a determination is made whether an object is selected (step 602). Typically, objects are highlighted for selection by manipulation of a pointer using a pointing device, such as a mouse, trackball, or touchpad. Other methods of selecting objects, such as by means of cursor control keys and menu commands also will be readily apparent to a person of ordinary skill in the art. If an object is selected, a determination is made whether the object is the first or only object selected (step 604). If the object is the first object selected, the object is designated as an "anchor" (step 606).

The position of the anchor object is fixed during object kerning and all other selected objects are repositioned relative to the anchor object. It will be understood that the selection of an anchor object may also be accomplished by designating the left-most, upper-most, or center object as the anchor object. In an alternate embodiment of the present invention, the process may align the objects without designating an object as the anchor. For example, the process of the present invention may center the objects or justify the objects relative to the margins.

Next, a variable "N" is set to the value "1" (step 608) and the process returns to step 602 to determine whether an object is selected. N represents a count of the number of objects in the selection.

With reference again to step 604, if the selected object is not the first selected object, the object is added to the selection (step 610) and the value of N is increased by one (step 612). Then, the process returns to step 602 to determine whether an object is selected.

If an object is not selected in step 602, a determination is made whether an action has been requested from the user (step 614). In the depicted example, an action may be any command issued by the user, such as "minimize" or "print." If an action is not requested, the process returns to step 602 to repeat determination as to whether an object has been selected.

If an action is requested in step 614, a determination is then made whether objects have been selected (step 616). If objects have been selected, a determination is made whether an instruction has been received to kern the distances of selected objects (step 618). Commands and instructions are issued to the program by the user through the graphical user interface, i.e. the buttons and menus, keystrokes, and/or a command-line interface, as are known in the art. Other means for allowing a user to issue commands will be readily apparent to a person of ordinary skill in the art. For example, the right-click capabilities within the Windows operating system may be used to present additional menu choices, such as "Kern Objects" when objects have been selected by highlighting.

If an instruction to kern distances has been received, the process aligns the selected objects (step 620), adjusts the distances between the selected objects (step 622), and returns to step 602 to determine whether an object is selected. The detailed operation of aligning the selected objects in step 620 according to a preferred embodiment of the present invention is described in more detail below with respect to FIG. 7. The detailed operation of adjusting the distances between the selected objects in step 622 according to a preferred embodiment of the present invention is described in more detail below with respect to FIG. 9.

With reference again to step 618, if an instruction to kern the distances of selected objects has not been received, a determination is made whether the requested action is to be performed on the selected objects (step 624). Actions to be performed on selected objects include, but are not limited to, "Move", "Cut", "Copy", and "Delete" as known in the art. If the requested action is to be performed on selected objects, the process performs the action, as with a conventional graphics program (step 626), and returns to step 602 to determine whether an object is selected. If the requested action is not to be performed on selected objects in step 624, the process proceeds perform any other action, as with a conventional graphics program (step 628). Other actions to be performed may include "minimize" or "print," as mentioned above; however, such actions are not the focus of the current invention and will not be described in further detail.

With reference again to step 616, if objects have not been selected, a determination is made as to whether the requested action is an exit command (step 630). If the action is an exit command, operation ends (step 632) and the program closes. If the action is not an exit command in step 630, the process proceeds to step 628 and performs any other requested action. Then, the process returns to step 602 to determine whether an object is selected.

Figure 7:
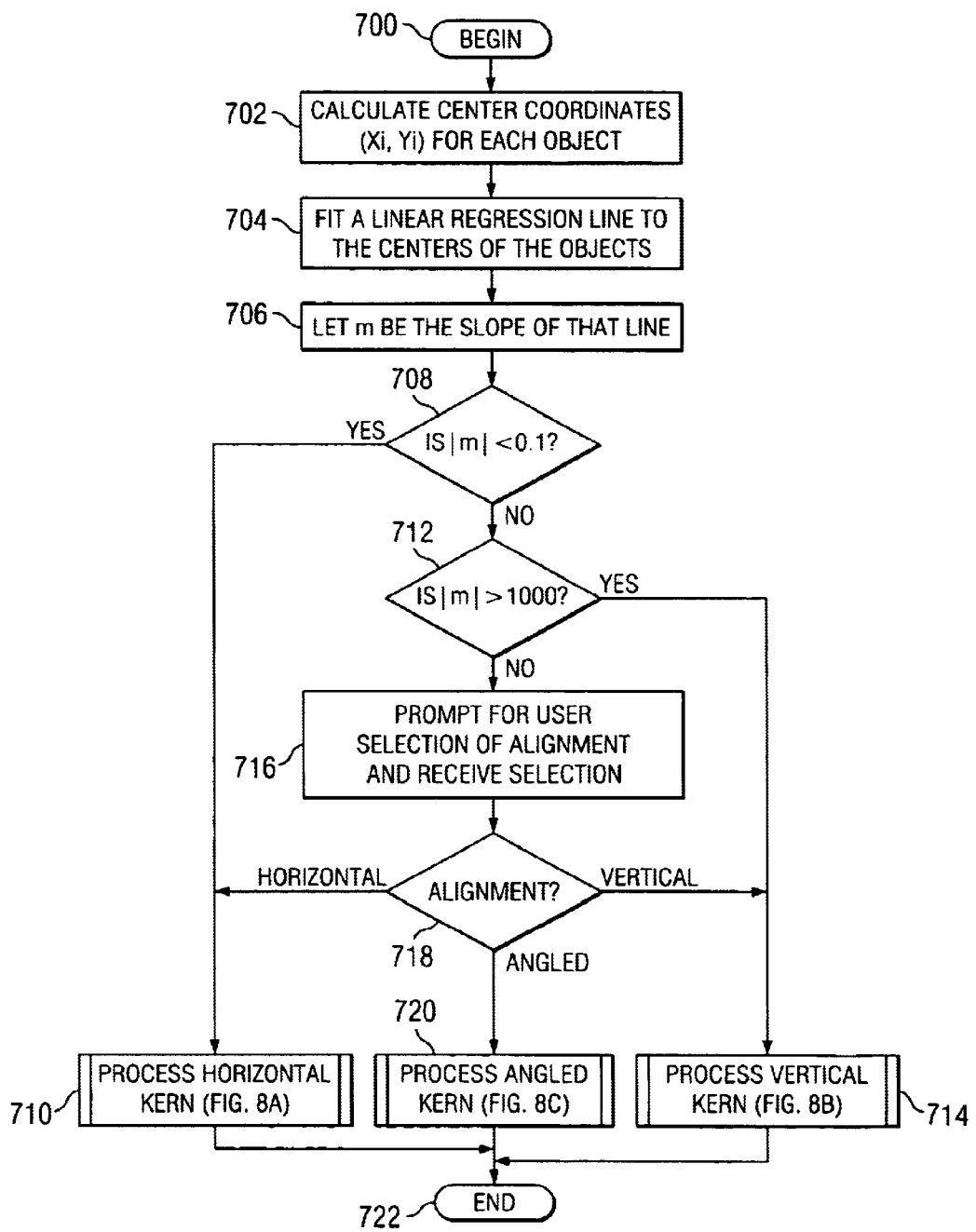
FIG. 7 is a flowchart of the operation of the alignment of graphical objects according to a preferred embodiment of the present invention.

With reference now to FIG. 7, a flowchart of the operation of the alignment of graphical objects in step 620 in FIG. 6 is depicted according to a preferred embodiment of the present invention.

The process begins at step 700 and calculates Cartesian coordinates $(x_i, y_i)$ for the center of each object (step 702). Then, the process fits a linear regression line to the centers of the objects (step 704) and calculates "m" to be the slope of that line (step 706). Next, a determination is made whether the absolute value of the slope m is less than a first predetermined threshold (step 708). In the depicted example, the threshold is set to 0.1; however, the threshold may be any value, which is small enough to reasonable indicate that the line is a horizontal line. If the slope is below the first predetermined threshold, a horizontal kern is processed (step 710) and the process ends (step 722). The detailed operation of the horizontal kern according to a preferred embodiment of the present invention is described in more detail below with respect to FIG. 8A.

If the absolute value of the slope is greater than or equal to the first predetermined threshold in step 708, a determination is made as to whether the absolute value of the slope is greater than a second predetermined threshold (step 712). In the depicted example, the threshold is set to 1000; however, the threshold may be any value, which is large enough to reasonable indicate that the line is a vertical line. If the slope is greater than the second predetermined threshold, a vertical kern is processed (step 714) and the process ends (step 722). The detailed operation of the vertical kern according to a preferred embodiment of the present invention is described in more detail below with respect to FIG. 8B.

If the absolute value of the slope is not greater than the second predetermined threshold in step 712, the process prompts the user to select an alignment and receives the selection of the user (step 716). A determination is then made as to whether the user selects a horizontal alignment, a vertical alignment, or an angled alignment (step 718). If the user selects a horizontal alignment, the process proceeds to step 710 to process a horizontal kern and the process ends (step 722). If the user selects a vertical alignment, the process proceeds to step 714 to process a vertical kern and the process ends (step 722). If the user selects an angled alignment, the process proceeds to step 720 to process an angled kern and the process ends (step 722). The detailed operation of the angled kern according to a preferred embodiment of the present invention is described in more detail below with respect to FIG. 8C.

Figure 8A:
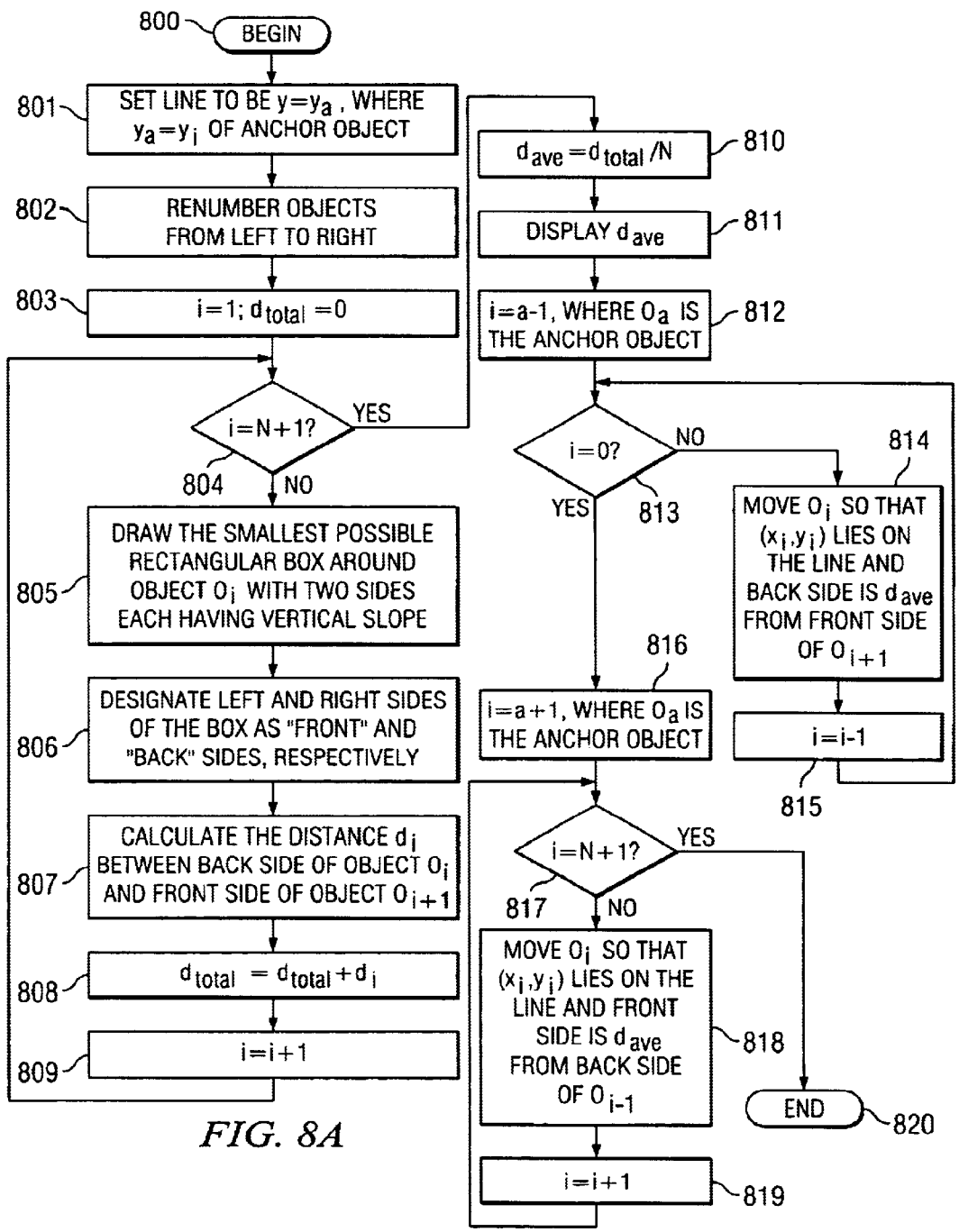
FIG. 8A is a flowchart of the operation of the horizontal alignment and kerning of graphical objects according to a preferred embodiment of the present invention.

Turning now to FIG. 8A, a flowchart of the operation of the horizontal alignment and kerning of graphical objects in step 710 in FIG. 7 is depicted according to a preferred embodiment of the present invention. The process begins at step 800 and a line is set to be $y=y_a$, where $y_a=y_i$ of the anchor object (step 801). Then the process renumbers the objects from left to right (step 802).

Next, the process initializes variable "i" equal to one and variable $d_{total}$ equal to zero (step 803) and proceeds to step 804, where a determination is made whether i=N+1. If i is not equal to N+1, the process draws the smallest possible rectangular box around object $O_i$ with two sides having a vertical slope (step 805). The left side is designated as the "front" side and the right side is designated as the "back" side (step 806). This designation is for notational purposes to remain consistent with the vertical and angled alignment and kerning processes described below. Then, the process calculates the distance $d_i$ between the back side of object $O_i$ and the front side of object $O_{i+1}$ (step 807). Thereafter, the process calculates $d_{total}=d_{total}+d_i$ (step 808) and sets i=i+1 (step 809) and returns to step 804 to determine whether i=N+1.

With reference again to step 804, if i=N+1 the process calculates $d_{ave}=d_{total}/n$ (step 810) and displays the value of $d_{ave}$ to the user (step 811). Then, the value of i is set to equal a−1, where $O_a$ is the anchor object (step 812) and a determination is made as to whether i=0 (step 813). If i does not equal zero, the process moves object $O_i$ so that the center point $(x_i, y_i)$ lies on the line and the back side of $O_i$ is $d_{ave}$ from the front side of $[O_i=1]$ $O_{i+1}$ (step 814). Next, the process sets i=i−1 (step 815) and returns to step 813 to determine whether i=0.

If i=0 in step 813, the process calculates i=a+1, where $O_a$ is the anchor object (step 816) and a determination is made as to whether i=N+1 (step 817). If i is not equal to N+1, then the process moves object $O_i$ so that the center point $(x_i, y_i)$ lies on the line and the front side of $O_i$ is $d_{ave}$ from the back side of $O_{i-1}$ (step 818). Afterwards, the process sets i=i+1 (step 819) and returns to step 817 to determine whether i=N+1. If i=N+1 in step 817, the process ends (step 820).

Figure 8B:
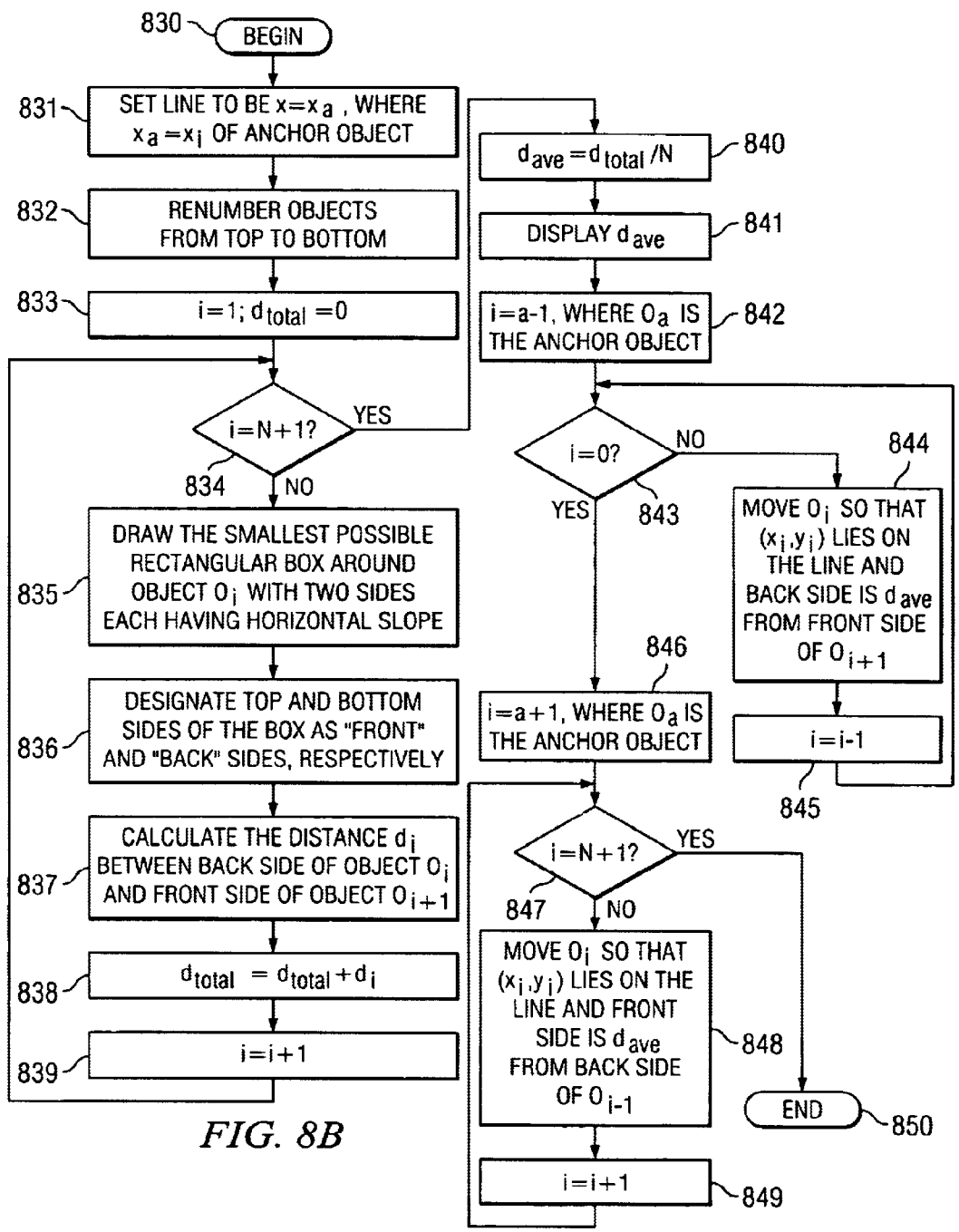
FIG. 8B is a flowchart of the operation of the vertical alignment and kerning of graphical objects according to a preferred embodiment of the present invention.

Turning now to FIG. 8B, a flowchart of the operation of the vertical alignment and kerning of graphical objects is step 714 in FIG. 7 is depicted according to a preferred embodiment of the present invention. The process begins at step 830 and a line is set to be $x=x_a$, where $x_a=x_i$ of the anchor object (step 831). Then the process renumbers the object from [left to right] top to bottom (step 832).

Next, the process initializes variable "i" equal to one and variable $d_{total}$ equal to zero (step 833) and proceeds to step 834, where a determination is made whether i=N+1. If i is not equal to N+1, the process draws the smallest possible rectangular box around object $O_i$ with two sides having a horizontal slope (step 835). The top side is designated as the "front" side and the bottom side is designated as the "back" side (step 836). This designation is merely for notational purposes to remain consistent with the horizontal and angled alignment and kerning processes described below. Then, the process calculates the distance $d_i$ between the back side of object $O_i$ and the front side of object $O_{i+1}$ (step 837). The process then calculates $d_{total}=d_{total}+d_i$ (step 838) and sets i=i+1 (step 839) and returns to step 834 to determine whether i=N+1.

With reference again to step 834, if i=N+1 the process calculates $d_{ave}=d_{total}/n$ (step 840) and displays the value of $d_{ave}$ to the user (step 841). Then, the value of i is set to equal a−1, where $O_a$ is the anchor object (step 842) and a determination is made as to whether i=0 (step 843). If i does not equal zero, the process moves object $O_i$ so that the center point $(x_i, y_i)$ lies on the line and the back side of $O_i$ is $d_{ave}$ from the front side of $[O_i=1]$ $O_{i+1}$ (step 844). Thereafter, the process sets i=i−1 (step 845) and returns to step 843 to determine whether i=0.

If i=0 in step 843, the process calculates i=a+1, where $O_a$ is the anchor object (step 846) and a determination is made as to whether i=N+1 (step 847). If i is not equal to N+1, then the process moves object $O_i$ so that the center point $(x_i, y_i)$ lies on the line and the front side of $O_i$ is $d_{ave}$ from the back side of $O_{i-1}$ (step 848). Then, the process sets i=i+1 (step 849) and returns to step 847 to determine whether i=N+1. If i=N+1 in step 847, the process ends (step 850).

Figure 8C:
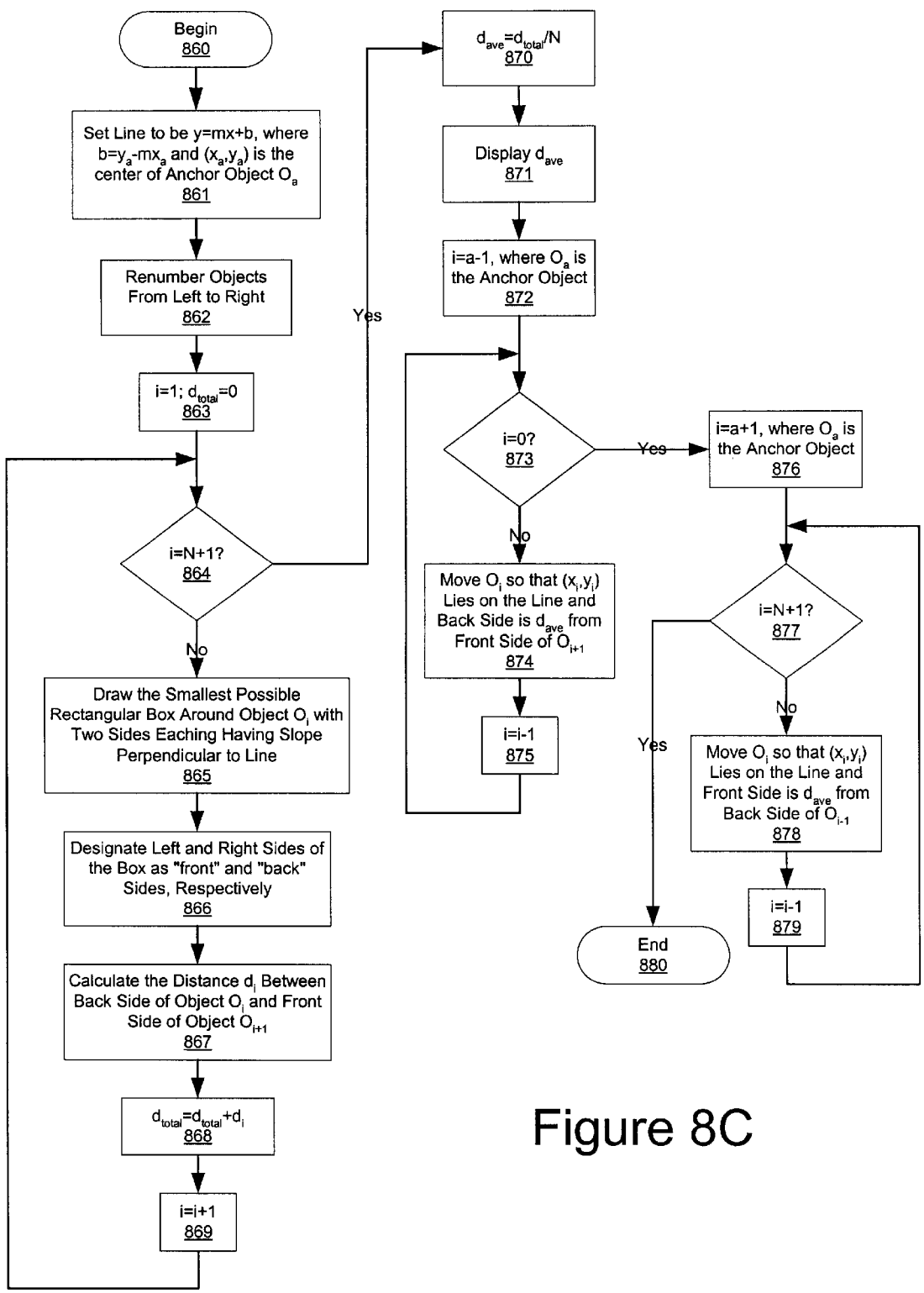
FIG. 8C is a flowchart of the operation of the angled alignment and kerning of graphical objects according to a preferred embodiment of the present invention.

Turning now to FIG. 8C, a flowchart of the operation of the angled alignment and kerning of graphical objects in step 720 in FIG. 7 is depicted according to a preferred embodiment of the present invention. The process begins at step 860 and a line is set at step 861 to be y=mx+b, where $b=y_a-mx_a$ and $(x_a, y_a)$ is the center of anchor object $O_a$. Then, the process renumbers the objects from left to right (step 862).

Next, the process initializes variable "I" equal to one and variable $d_{total}$ equal to zero (step 863) and proceeds to step 864, where a determination is made whether i=N+1. If I is not equal to N+1, the process draws the smallest possible rectangular box around object $O_i$ with two sides having a slope perpendicular to the line (step 865). The left side is designated as the "front" side and the right side is designated as the "back" side (step 866). This designation is merely for notational purposed to remain consistent with the vertical and angled alignment and kerning processes described below. Alternatively, the objects may be numbered from top to bottom and the top side may be designated as the "front" side, while the bottom side may be designated as the "back" side. Then, the process calculates the distance $d_i$ between the back side of object $O_i$ and the front side of object $O_{i+1}$ (step [868] 867). The process then calculates $d_{total}=d_{total}+d_i$ (step 868) and sets i+i1 (step 869) and returns to step 864 to determine whether i=N+1.

With reference again to step 864, if i=N+1 the process calculates $d_{ave}=d_{total}/n$ (step 870) and displays the value of $d_{ave}$ to the user (step 871). Then, the value of i is set to equal a−1, where $O_a$ is the anchor object (step 872) and a determination is made as to whether i=0 (step 873). If i does not equal zero, the process moves object $O_i$ so that the center point ($x_i$, $y_i$) lies on the line and the back side of $O_i$ is $d_{ave}$ from the front side of [$O_i$=1] $O_{i+1}$ (step 874). Next, the process sets i=i−1 (step 875) and returns to step 873 to determine whether i=0.

If i=0 in step 873, the process calculates i=a+1, where $O_a$ is the anchor object (step 876) and a determination is made as to whether i=N+1 (step 877). If i is not equal to N+1, then the process moves object $O_i$ so that the center point ($x_i$, $y_i$) lies on the line and the front side of $O_i$ is $d_{ave}$ from the back side of $O_{i-1}$ (step 878). Thereafter, the process sets i=i+1 (step 879) and returns to step 877 to determine whether i=N+1. If i=N+1 in step 877, the process ends (step 880).

Figure 9:
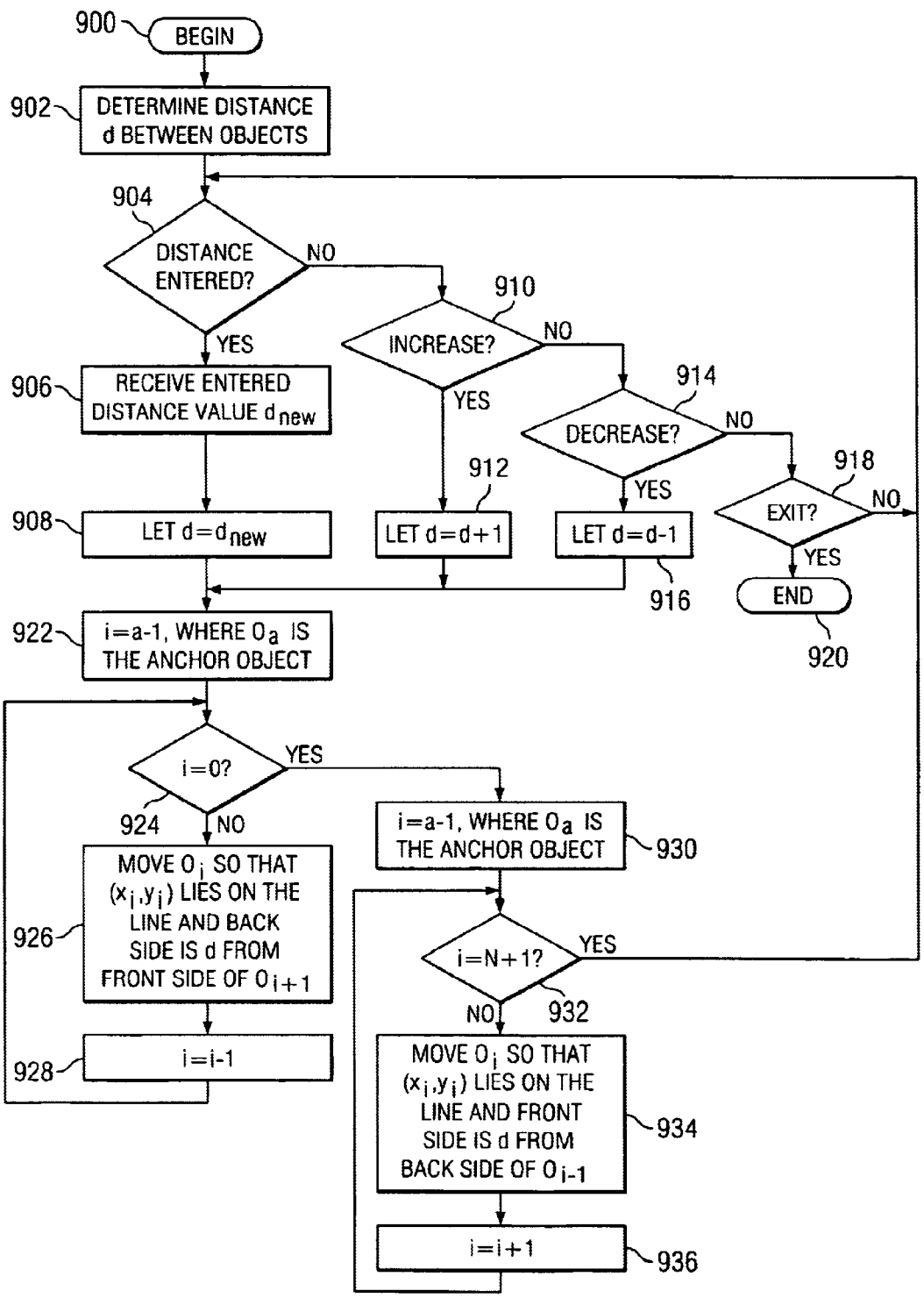
FIG. 9 is a flowchart of the operation of kerning graphical objects according to a preferred embodiment of the present invention.

With reference now to FIG. 9, a flowchart of the operation of kerning graphical objects in step 622 in FIG. 6 is depicted according to a preferred embodiment of the present invention. The process begins at step 900 and a distance "d" between the objects is determined (step 902). A determination is made as to whether a distance is entered by the user (step 904). If a distance is entered, the process receives the entered distance a value $d_{new}$ (step 906) and sets d=$d_{new}$ (step 908). According to a preferred embodiment of the present invention, a distance may be directly entered into distance field 420. The process then proceeds to step 922 and adjusts the spacing of the objects, as described below.

If a distance is not entered by the user in step 904, then a determination is made as to whether an increase. instruction has been received by the user (step 910). If an increase instruction has been received, the process sets d=d+1 (step 912) and proceeds to step 922 and adjusts the spacing of the objects, as described below. If an increase instruction has not been received in step 910, a determination is made as to whether a decrease instruction has been received by the user (step 914). If a decrease instruction has been received, the process sets d=d−1 (step 916) and proceeds to step 922 and adjusts the spacing of the objects, as described below.

With reference again to step 914, if a decrease instruction has not been received, a determination is made as to whether an "exit" instruction has been received (step 918). An "exit" instruction may be an instruction by the user to close the program, the document, or the object kerning pallet 416. As will be understood by a person of ordinary skill in the art, an "exit" instruction may also be any action performed by the user which indicates that the user is finished kerning the objects. For example, any action which results in the plurality of objects being deselected may be an "exit" instruction. If an "exit" instruction is received in step 918, the process ends (step 920). If an "exit" instruction is not received, the process returns to step 904 to determine whether a distance is entered.

With reference again to step 922, the process sets i=a−1, where $O_a$ is the anchor object and a determination is made as to whether i=0 (step 924). If i is not equal to zero, then the process moves object $O_i$ so that ($x_i$, $y_i$) lies on the line and the "back" side of $O_i$ is d from the "front" side of $O_{i+1}$ (step 926). Then, the process sets i=i−1 (step 928) and returns to step 924 to determine whether i=0. If i=0 in step 924, the process sets i=a+1, where $O_a$ is the anchor object (step 930) and a determination is made as to whether i=N+1 (step 932). If i is not equal to N+1, then the process moves object $O_i$ so that ($x_i$, $y_i$) lies on the line and the "front" side of $O_i$ is d from the "back" side of $O_{i-1}$ (step 934). Then, the process sets [i=i=1] i=i+1 (step 936) and returns to step 932 to determine whether i=N+1. If i=N+1 in step 932, the process returns to step 904 to determine whether a distance is entered by the user.

Thus, the present invention solves the disadvantages of the prior art by allowing the user to automatically align and kern the distances of a plurality of graphical objects along a horizontal, vertical, or angled line. Alternatively, the user may align the graphical objects along some other shape. For example, the graphical objects may lie along a curve or the perimeter of a circle. A person of ordinary skill in the art will recognize that the objects may be fit to a shape, such as a parabola or semicircle, and that the distances may be kerned along the shape.

It is important to note that while the present invention has been described in the context of a fully functioning data processing system, those of ordinary skill in the art will appreciate that the processes of the present invention are capable of being distributed in the form of a computer readable medium of instructions for execution by a processor and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for kerning a plurality of objects presented on a display, wherein each pair of adjacent objects within the plurality of objects has a distance, the method comprising the following computer implemented steps:
   receiving a selection of the plurality of objects;
   aligning the selected plurality of objects along a line;
   receiving a distance adjustment request; and
   automatically adjusting the distance between each pair of adjacent objects of the plurality of objects along the line according to the distance adjustment request in response to receiving the distance adjustment request, wherein the step of aligning the selected plurality of objects along a line comprises the following steps:
   determining a center coordinate of each of the objects; and
   fitting a linear regression line to centers of the objects.

2. The method of claim 1, wherein the distance adjustment request is an increase request and the step of automatically adjusting distances between each pair of adjacent objects of the plurality of objects along the line comprises decreasing the distances.

3. The method of claim 1, wherein the distance adjustment request is a decrease request and the step of automatically adjusting distances between each pair of adjacent objects of the plurality of objects along the line comprises decreasing the distances.

4. The method of claim 1, wherein the distance adjustment request includes a distance value and the step of automatically adjusting the distance between each pair of adjacent objects of the plurality of objects along the line comprises adjusting the positions of the objects so that the distance between each pair of adjacent objects is equal to said distance value.

5. The method of claim 1, wherein the step of automatically adjusting the distance between each pair of adjacent objects of the plurality of objects along the line comprises adjusting the positions of the objects so that the distances between pairs of adjacent objects are equal.

6. A method in a data processing system for kerning a plurality of objects presented on a display, wherein each pair of adjacent objects within the plurality of objects has a distance, the comprising implemented steps:

first receiving means for receiving a selection of the plurality of objects;

aligning means for aligning the selected plurality of objects along a line;

second receiving means for receiving a distance adjustment request; and adjusting means for automatically adjusting the distance between each pair of adjacent objects of the plurality of objects along the line according to the distance adjustment request in response to receiving the distance adjustment request, wherein the aligning means comprises:

determining means for determining a center coordinate for each of the objects; and fitting means for fitting a linear regression line to centers of the objects.

7. The system of claim 6, wherein the distance adjustment request is an increase request and adjusting means comprises means for increasing the distances.

8. The system of claim 6, wherein the distance adjustment request is a decrease request and the adjusting means comprises means for decreasing the distances.

9. The system of claim 6, wherein the distance adjustment request includes a distance value and the adjusting means comprises means for adjusting the positions of the objects so that the distance between each pair of adjacent objects is equal to said distance value.

10. The system of claim 6, wherein the adjusting means comprises means for adjusting the positions of the objects so that the distances between pairs of adjacent objects are equal.

* * * * *

UNITED STATES PATENT AND TRADEMARK OFFICE
CERTIFICATE OF CORRECTION

PATENT NO. : 6,686,935 B1  
APPLICATION NO. : 09/578191  
DATED : February 3, 2004  
INVENTOR(S) : Richard Page 1 of 1

It is certified that error appears in the above-identified patent and that said Letters Patent is hereby corrected as shown below:

On Title Page, Item (57) Abstract, line 1: delete "METHOD AND APPARATUS FOR OBJECT KERNING".

Col. 10, line 49: after "for" delete "kerming" and insert --kerning--

Col. 11, line 2: after "comprises" delete "decreasing" and insert --increasing--.

Col. 11, line 21: after "A" delete "method in a".

Col. 11, line 24: after "distance," delete "the".

Col. 11, line 24: after "comprising" delete "implemented steps".

Signed and Sealed this

Twenty-seventh Day of March, 2007

JON W. DUDAS  
*Director of the United States Patent and Trademark Office*